United States Patent [19]
Chiquet

[11] 4,022,403
[45] May 10, 1977

[54] CONVERTIBLE AIRCRAFT

[76] Inventor: Louis Francois Chiquet, P.O. Box 3134, Jacksonville, Fla. 32206

[22] Filed: Jan. 28, 1976

[21] Appl. No.: 643,475

[52] U.S. Cl. .................................. 244/46; 244/2; 244/49
[51] Int. Cl.² ........................................ B64C 3/40
[58] Field of Search ........ 244/38, 2, 46, 49, 114 R, 244/115, 116; 104/23 R, 23 FS; 105/215 R, 215 C; 238/127, 128

[56] References Cited

UNITED STATES PATENTS

| | | | |
|---|---|---|---|
| 141,217 | 7/1873 | Ghirardini | 238/128 |
| 2,319,446 | 5/1943 | Dowty | 244/102.55 |
| 3,140,842 | 7/1964 | Craigo et al. | 244/46 |
| 3,701,323 | 10/1972 | Cox | 105/215 C |
| 3,715,991 | 2/1973 | Boyd | 104/23 R |
| 3,830,452 | 8/1974 | Seay | 244/116 |

FOREIGN PATENTS OR APPLICATIONS

| | | | |
|---|---|---|---|
| 54,814 | 8/1950 | France | 244/49 |
| 372,863 | 7/1939 | Italy | 244/114 R |
| 566,334 | 8/1957 | Italy | 244/46 |
| 672,959 | 5/1952 | United Kingdom | 244/49 |

*Primary Examiner*—Trygve M. Blix
*Assistant Examiner*—Galen L. Barefoot

[57] ABSTRACT

An aircraft that is designed to additionally be able to travel along a railroad track so that it can get into a heart of a city, instead of terminating at an airport located some distance away from the city; the aircraft including wings which can be folded inwardly adjacent the side of the aircraft fuselage so that it requires approximately a same width of clearance as a conventional railroad train, and the railroad tracks being additionally fitted with a system of channel rails welded on top of the old railroad track so that the airplane can travel thereupon.

1 Claim, 2 Drawing Figures

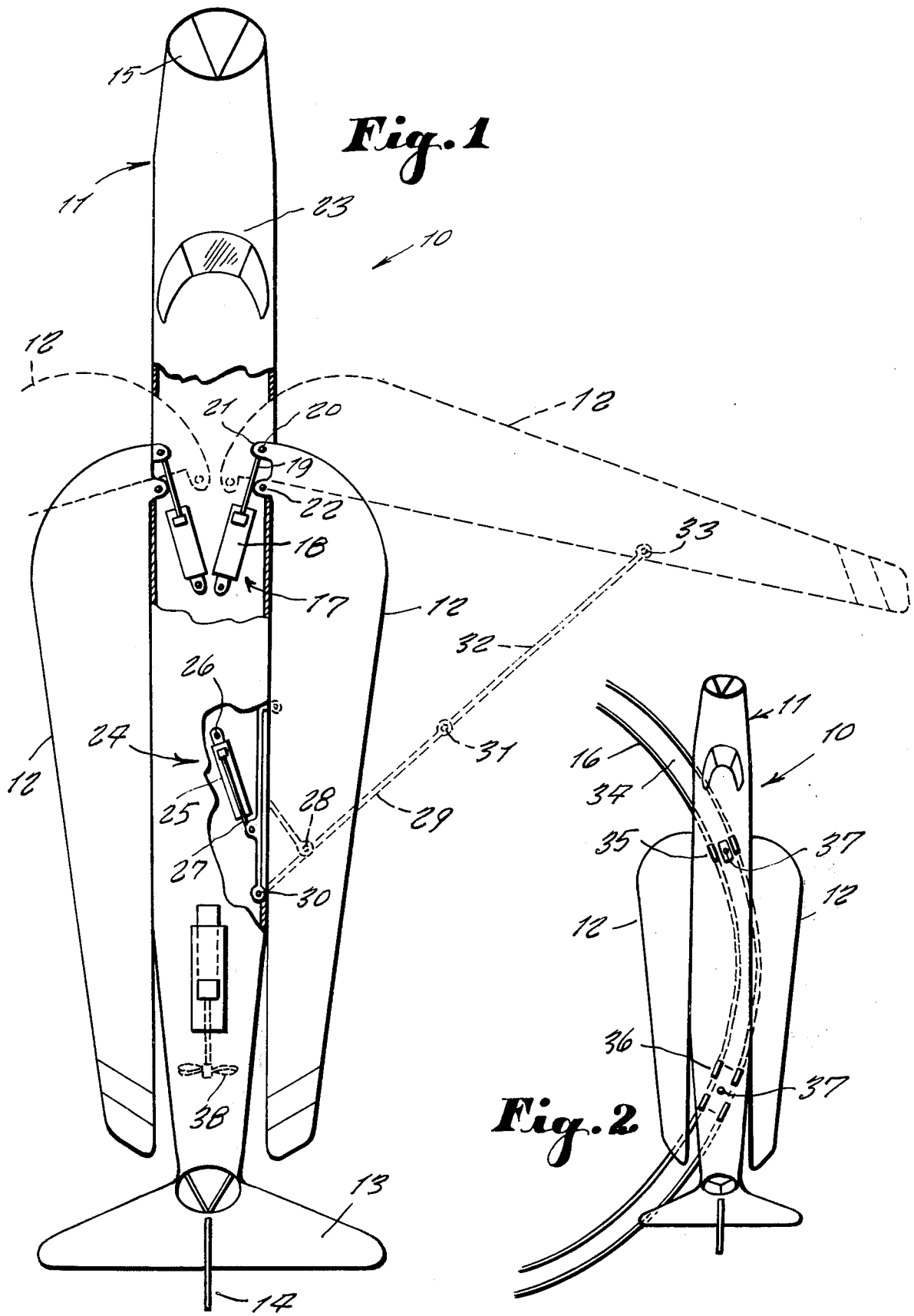

CONVERTIBLE AIRCRAFT

This invention relates generally to aircraft.

A principal purpose of the present invention is to provide a super speed rocket jet which comprises an airplane which in addition to being able to fly through the air, can additionally travel along a railroad track in order that it may get into a heart of a city, thus eliminating the necessity of unloading people at an airport that is located outside of the city, some distance away.

Another object of the present invention is to provide a super speed rocket jet, in which the wings are designed so to be foldable inwardly against the side of the airplane fuselage, so that when it travels on a railroad track, it does not require the wide space such as when it flys with its wings stretched outwardly.

Another object of the present invention is to provide a super speed rocket jet which incorporates jet engines so that when it travels along a railroad track it can move at a far greater speed than is possible by a conventional railroad train, so that it saves considerable time for transporting persons between points serviced by a railroad track.

Other objects are to provide a super speed rocket jet which is simple in design, inexpensive to manufacture, rugged in construction, easy to use and efficient in operation.

These and other objects will be readily evident upon a study of the following specification and accompanying drawing, wherein:

FIG. 1 is a top view showing the airplane partly in cross section, and showing the mechanism for moving the airplane wings between an extended and inwardly retracted position;

FIG. 2 is a top view of the airplane shown traveling on a railroad track, and showing how the airplane wheel truck located at a front and rear of the craft permits the plane to move around relatively sharp curve of railroad track.

Referring now to the drawing in greater detail the reference numeral 10 represents a super speed rocket jet according to the present invention wherein there is an airplane fuselage 11 having a pair of wings 12, a tail 13 and a rudder 14. The airplane is provided with a jet engine 15 located along the fuselage 11 for purpose of propelling the airplane ahead in flight and also upon a ground. When the airplane is in flight, its wings 12 extend sidewardly as indicated by the dotted lines in FIG. 1, so that it can become airborne in normal flight.

In the present invention, the wings 12 are made to be retractable in order that the airplane 10 can additionally travel upon a railroad track 16 when it moves across the ground surface.

The airplane, in addition to its normal machinery for enabling it to fly, also includes a mechanism 17 which enables the wings 12 to be pivotable between the sidewardly extended position shown by the dotted lines in FIG. 1 to the position shown by solid lines in the same figure, wherein the wings are folded parallel adjacent a side of the fuselage. The mechanism 17 includes for each wing 12 a hydraulic cylinder 18 having a piston rod 19 pivotally attached by means of pin 20 to an inboard tip 21 of the wing and which is relatively close to a stationary pivot pin 22 affixed to the fuselage and about which the wing pivots. Thus as shown, with a relatively short movement of the piston rod 19, the wing can be pivoted a relatively great distance between the two different positions illustrated in FIG. 1. The hydraulic cylinder is controlled through valves that are operated from the cockpit 23 by the pilot.

In order to maintain the wings 12 in a stable position when in a sidewardly extended position, there is a brace mechanism 24 located in a rearward portion of the fuselage for each of the wings.

The brace mechanism 24 includes a hydraulic cylinder 25 pivotable at one end about stationary pivot pin 26, the other end of the hydraulic cylinder having an outwardly slideable piston rod 27 connected at its outward end by means of pin 28 to an intermediate portion of an arm 29 pivotable at one end about a pin 30 stationarily mounted to the fuselage so that the arm 29 can pivot outwardly from the position as shown in solid lines. The opposite end of the arm 29 is pivotally attached by means of pivot pin 31 to an end of a brace 32 which at its opposite end is connected by means of pivot pin 33 to the wing 12. It is now evident that when the wing is in an inwardly retracted position, the brace 32 pivots about pin 31 so that it comes parallel and adjacent to the arm 29 and also along a side of the fuselage 11. However when the wing is in an extended position, the arm and brace extend out in a straight line and are held in this position by means of the piston rod 27 that firmly holds them in this place. Thus a novel bracing is provided for the wing when it is in its extended position.

In order that the airplane can travel upon the railroad track 16, the tack 16 has a channel rail 34 welded upon the original railroad track so that it is suitable for carrying both conventional railroad stock as well as the super speed rocket jet 10.

As shown in Fig. 2, the airplane includes a forward truck 35 and a rear truck 36 each of which is freely pivotable about a pivot pin 37, so that the airplane can be moved along straight or curved tracks, as as is evident by the FIG. 2.

In addition to the conventional engine 15, the airplane includes a marine propeller 38 so that in such instances, the aircraft can also be used for moving across a water in case the aircraft is of amphibious type.

Thus there is provided a super speed rocket jet that eliminates the problem of discharging passengers after an air flight at an airport terminal which is located many miles away from a heart of a city, the present invention allowing the airplane to continue along the ground after having landed so to bring the passengers into the heart of the city.

While various changes may be made in the detail construction, it is understood that such changes will be within the spirit and scope of the present invention as is defined by the appended claims.

What I now claim is:

1. In a convertible aircraft, the combination of an airplane fuselage, a jet engine mounted along said fuselage, a pair of wings connected to said fuselage, a tail with rudder, and means for said wings to be retracted from a sidewardly extended position to a position alongside said fuselage, said means comprising for each wing a hydraulic cylinder located in a forward portion of said fuselage, said hydraulic cylinder having a piston rod which at its end is pivotally connected to an inboard end of said wing which is located close to a pivot about which said wing pivots, and a bracing mechanism being located in a rear portion of said fuselage, said bracing mechanism including a second hydraulic cylinder pivotable at one end about a stationary pin on said fuselage, a piston of said second cylinder being attached at its outward end to an intermediate portion of an arm which at its one end is pivotable about another stationary pin of said fuselage, an opposite end of said arm being pivotally attached to one end of a brace which at its other end is pivotally attached to said wing.

* * * * *